United States Patent [19]

Liou

[11] Patent Number: 5,015,820
[45] Date of Patent: May 14, 1991

[54] METHOD OF MAKING SPRING WASHER WITH LASER BEAM

[75] Inventor: Chueh-Horng Liou, Hsin Chu Shien, Taiwan

[73] Assignee: Industrial Technology Research Institute, Hsin Chu Hsien, Taiwan

[21] Appl. No.: 528,851

[22] Filed: May 25, 1990

[51] Int. Cl.$^5$ ............................................. B23K 26/00
[52] U.S. Cl. ................................................ 219/121.72
[58] Field of Search ...................... 219/121.67, 121.72, 219/121.6, 121.85

[56] References Cited

FOREIGN PATENT DOCUMENTS

| | | | |
|---|---|---|---|
| 0150682 | 8/1984 | Japan | 219/121.72 |
| 0202195 | 11/1984 | Japan | 219/121.72 |
| 0096383 | 5/1985 | Japan | 219/121.72 |

*Primary Examiner*—C. L. Albritton
*Attorney, Agent, or Firm*—Cushman, Darby & Cushman

[57] ABSTRACT

It is a method of making spring washers by means of a laser beam and a spring coil; the laser beam is focused perpendicularly at the spring coil in a ⅓ depth from the surface of the spring coil; a relative movement between the laser beam and the spring coil is made during cutting the spring coil.

1 Claim, 1 Drawing Sheet

METHOD OF MAKING SPRING WASHER WITH LASER BEAM

BACKGROUND OF THE INVENTION

The spring washers have widely been used in mechanical parts, and have become indispensable parts in the mechanical field. According to the conventional method of making spring washers, a steel wire is first wound into a spring coil, and then the spring coil is cut, with a punching machine, into a plurality of spring washers; however, the conventional method of making spring washer results in a considerable noise, which would badly affect the working efficiency of washer. Moreover, since the working speed of a punching machine is limited, the production efficiency would be bottlenecked thereby, and the quality of the products cannot easily be controlled at a given level.

SUMMARY OF THE INVENTION

This invention relates to a method of using laser to cut a spring coil into a plurality of spring washers.

The prime object of the present invention is to provide a laser processing method to replace the punching method of making spring washer with a view of improving the product quality and the efficiency of production.

The major feature of the present invention is to use a laser beam to aim at the axis of a spring coil perpendicularly, and the laser beam is focused to a point about ⅓ in depth from the surface of the coil. During cutting operation, the spring coil moves axially and relatively to the laser beam.

DETAILED DESCRIPTION

Figure 1:
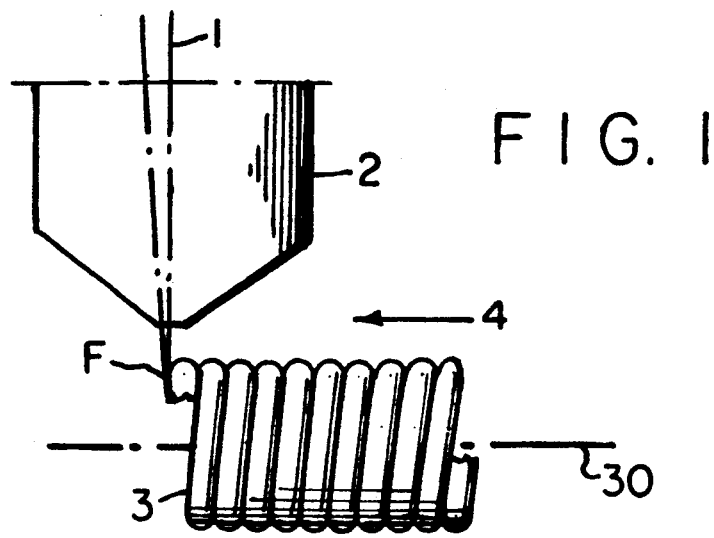
FIG. 1 is a front view of the processing tools according to the method of the present invention.

FIG. 1 illustrates a front view of the processing tools according to the method of the present invention; the laser beam 1 is jetted out of the nozzle 2, and is focused at a point F for cutting the spring washer 3 already formed. The spring coil 3 is fixed in place by means of a clamp (not shown), and the axis 30 of the spring coil 3 is perpendiculor to the laser beam 1. The spring coil 3 moves, relative to the nozzle 2, along the axis 4 thereof during cutting operation. The strength and the moving speed are to be adjusted adequately so as to cut only the part which is close to the nozzle 2 without damaging the other part of the spring coil.

Figure 2:
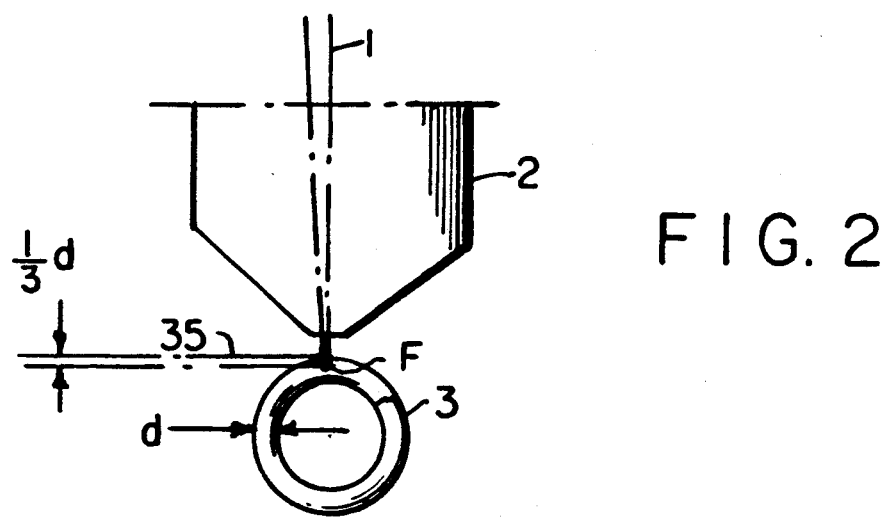
FIG. 2 is a side view of FIG. 1 according to the present invention.
Figure 3:
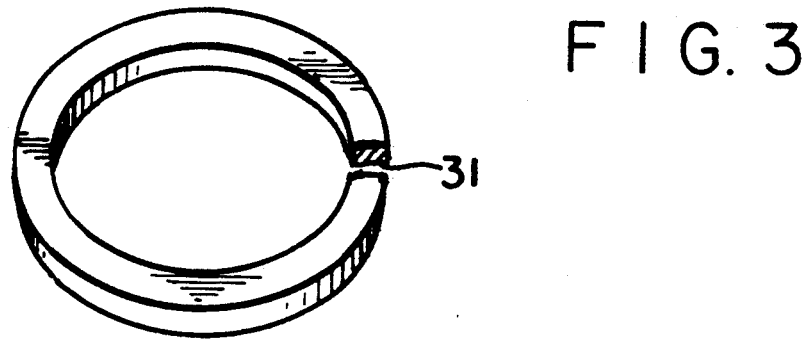
FIG. 3 is a perspective view of a spring wash made according to the method of the present invention.

Referring to FIG. 2, it is a side view of FIG. 1, showing the focus F of the laser beam 1 is felt at the ⅓ diameter point under the coil surface 35. Since the spring coil 3 is moving relatively to the nozzle 2, every spring washer will be cut from it with an open gap 31, as shown in FIG. 3.

What is claimed is:

1. A method of making a spring washer comprising the steps of:
   positioning a laser adjacent a spring coil, said spring coil serving as stock from which a plurality of individual spring washers are to be cut, said spring coil further including a central axis;
   directing a laser beam emitted from said laser perpendicular to and intersecting with said spring coil central axis;
   focusing the laser beam into said spring coil at a depth of one-third of a diameter of said spring coil; and
   moving said laser relative to said spring coil central axis so as to cut said spring coil into a plurality of individual spring washers.

* * * * *